United States Patent Office 3,350,271
Patented Oct. 31, 1967

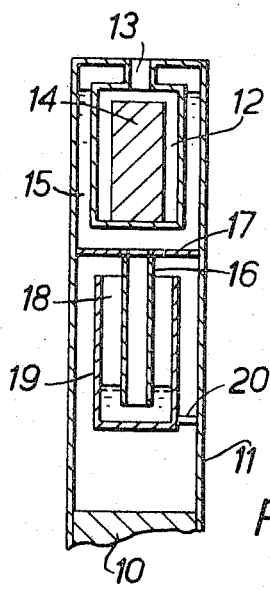
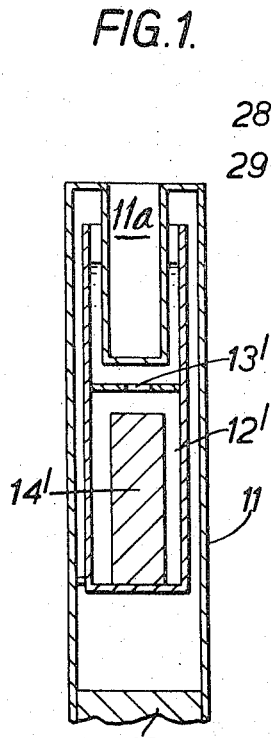
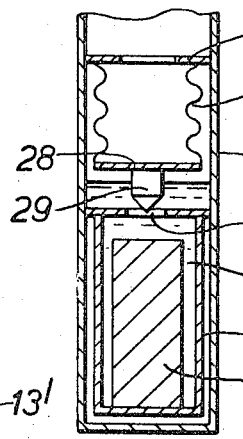
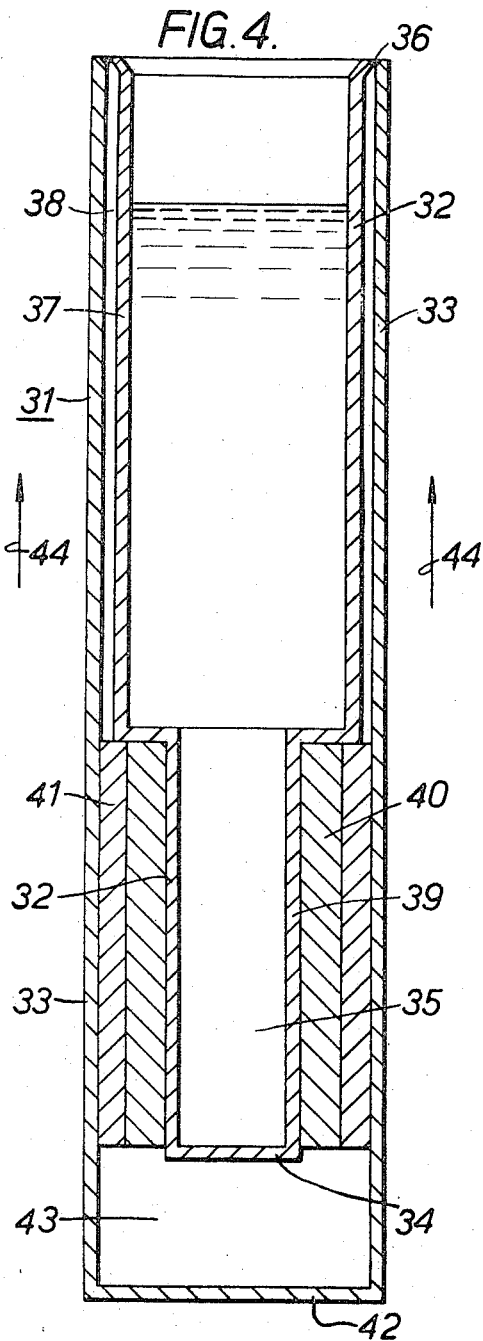

3,350,271
NUCLEAR REACTOR TRANSDUCER
Leslie Maidment and Thomas Joseph Ledwidge, Thurso, Caithness, Scotland, assignors to United Kingdom Atomic Energy Authority, London, England
Filed Sept. 20, 1965, Ser. No. 488,587
Claims priority, application Great Britain, Sept. 21, 1964, 38,484/64
8 Claims. (Cl. 176—19)

This invention relates to transducers for use in nuclear reactors.

In the case of a nuclear reactor having a core of fuel elements each comprising fissile material enclosed in a protective sheath, a knowledge of pressure changes within the sheath during reactor operation is useful as it can afford an indication of e.g. the development of a leak in the sheath.

The present invention seeks to provide transducers for use in nuclear reactors to give for example information of such pressure changes, and involving the conversion of heat energy to sonic energy.

According to one aspect of the present invention a transducer for use in a nuclear reactor comprises a capsule defining a compartment to house a liquid, and containing material adapted to generate heat during reactor operation, the material being disposed relative to the compartment so that an identifiable acoustic signal can be generated by heat transfer from the material to liquid in the compartment.

The transducer is conveniently designed to generate a sound signal at a predetermined frequency which does not occur in the normal background noise of the reactor, and which is thus readily detectable.

The transducer may be in the form of a separate nuclear reactor component or be fitted to or form part of an individual nuclear reactor fuel element or pin, and may be arranged so that the heat transfer gives rise to vapour formation in liquid in the compartment, which vapour is passed through an orifice to give detectable sound waves. Alternatively use may be made of preliminary bubble formation in the liquid in the compartment by heat transfer, such formation generating a spectrum of detectable sonic waves.

The signal may be monitored using detecting apparatus in which the signal is preferably amplified and recorded, and which may incorporate a waveguide for transmission of the sound waves.

The invention also includes within its scope a nuclear reactor in which is installed a transducer as disclosed above.

Four embodiments of the invention are shown in enlarged sectional elevation in FIGURES 1 to 4 of the accompanying exemplifying drawings.

The transducers shown in FIGURES 1 to 3 of the drawings are designed for use in a sodium-cooled fast nuclear reactor having inside a pressure vessel a core composed of fuel element sub-assemblies, each sub-assembly having an outer casing in which are carried a large number of sheathed fuel elements in the form of rods or pins extending longitudinally of the casing in spaced parallel relationship so as to define between them narrow channels for the flow of the liquid sodium through the core. The fuel pins are vertically orientated and the liquid sodium flows upwardly in the channels between the fuel pins. Such a reactor is described in our Belgian patent specification No. 638,683.

FIGURE 1 of the drawings shows a nuclear reactor transducer in the form of a pressure-sensing device forming part of a fuel element or pin having a main reactor core component of fissile fuel material 10 enclosed in a protective sheath 11. At its upper end the sheath 11 defines a compartment 12 in communication with ambient liquid coolant by way of whistle orifice 13. In the compartment 12 is a coaxial solid cylinder 14 of fissile material like the material 10 and the sheath 11 also defines an annular space 15 round the compartment 12. The space 15 communicates, by way of a tube 16 attached to an annular plate 17 carried from the sheath 11, with a chamber 18 bounded by a vessel 19 supported from the sheath 11 by webs 20. The material 14 forms only a small fraction of the total fuel content of the fuel element.

In use the compartment 12 contains liquid such as that used as the coolant, i.e. liquid sodium, the space 15 contains a suitable liquid heat transfer medium such as for example lead and under reactor operating conditions the space between the fissile material 10 and the plate 17 is pressurised as for example by gaseous fission product build up. This pressure exerts a force on the surface of the liquid in the chamber 18, and thus variation of this pressure varies the level of the liquid in the space 15. Heat is of course generated by fission of the material 14. Heat transfer from the material 14 to the ambient liquid coolant outside the fuel element is by way of the liquid in the compartment 12 and in the space 15, and thus variation in the level of the liquid in the space 15 varies this heat transfer and thus the heat transfer to the liquid in the compartment 12 and hence the degree of boiling in the liquid in the compartment 12. This in turn varies the sound signal from the orifice 13, and can thus be used to obtain an indication of the attainment of a predetermined pressure or to measure the pressure.

Vapour formed by bulk boiling of the liquid in the compartment 12 passes through the orifice 13 to give detectable sound waves which may be monitored in a manner generally similar to that described in the above-mentioned Belgian patent specification No. 638,683 in which a sound guide is associated with each one of the fuel element sub-assemblies with a view to detecting the onset of boiling in the liquid sodium passing through any fuel element sub-assembly. In the same manner "nucleate boiling" in the liquid in the compartment 12 can be detected, that is to say the formation of small bubbles which occurs as a preliminary to bulk boiling.

Such a device suitably calibrated can be used to give an indication of a burst or leak in the fuel pin sheath, such a leak being associated with a drop in pressure within the sheath and hence a drop in signal strength.

An alternative version of the device of FIGURE 1 is shown in FIGURE 2 in which version the device is completely sealed and liquid in the compartment 12' around the material 14' and immersing orifice 13' is subjected to the pressure in the space above the material 10. A recess 11a is formed by an extension of the sheath 11 and extends downwardly into compartment 12 to a level below the free surface of the liquid in compartment 12. Variation of the pressure varies the signal obtained by nucleate boiling or orifice noise of the liquid.

FIGURE 3 shows a transducer in the form of a pressure sensitive device forming part of a fuel element having a protective sheath 21. At its lower end the sheath 21 carries a spaced inner sheath 22 defining a gas gap and an orifice 23. A coaxial solid cylinder 24 of fissile material is disposed in a compartment 25 bounded by the sheath 22. A bellows 26 in the form of a stack of annular diaphragms welded together at their outer edges is sealed at its upper end to an annular plate 27 carried by the sheath 21 and is sealed at its lower end to an end plate 28 carrying a part-tapered needle 29 for co-operation with the orifice 23.

The compartment 25 houses a liquid such as liquid sodium, and during reactor operation the position of the needle 29 with respect to the orifice 23 is determined by the pressure difference across the bellows 26 which is dependent on the gaseous fission product pressure in the space above the bellows. The noise spectrum of the capsule of FIGURE 3 is thus modulated by the pressure to be indicated or measured. For indication that a critical pressure has been reached, the effective orifice size is significantly changed at that pressure so that there is a significant change in the amplitude of the noise output in the selected frequency or datum band. For pressure measurement the effective orifice is varied to vary the amplitude of the output signal. In other words for pressure measurement the orifice size is varied by the tapered portion of the needle 29, whereas the orifice size is significantly changed to indicate a critical pressure by transition from the tapered to the untapered portion of the needle 29.

The invention is not limited to pressure-sensitive devices. Thus FIGURE 4 shows a nuclear reactor transducer in the form of a temperature-sensitive device which comprises a capsule having a sheath 31 having inner and outer tubular walls 32, 33 respectively. The wall 32 is closed at its lower end by an integral end plate 34 and defines a compartment in the form of a reservoir or pot 35 adapted to house a liquid such as that used as the reactor coolant, namely liquid sodium. The walls 32, 33 are sealingly joined together at their upper ends as by a weld 36, and upper portion 37 of the wall 32 is spaced from the wall 33 by an annular gap 38. Lower portion 39 of the wall 32 is of reduced size as compared with the portion 37, and in good heat transfer relationship therewith is fissile material in the form of an external uranium sleeve 40 which thus effectively encircles or surrounds the pot 35. Between the sleeve 40 and the wall 33 is a fusible link in the form of a sleeve 41 made of a material such as a metal alloy of predetermined and well defined melting point. The sleeve 41 is in good heat transfer relationship with the sleeve 40 and the length of the wall 33 over which it extends. The lower end of the wall 33 is closed by an integral end plate 42 which is spaced from the end plate 34. In this way there is provided at the base of the device a sink or drainage cavity 43 bounded by the plates 34, 42, sleeves 40, 41 and wall 33. The gap 38 and cavity 43 contain a gas such as for example argon.

When the device shown in FIGURE 4 of the drawings and other similar devices are installed in, say, a sodium-cooled nuclear reactor, liquid sodium flows upwardly and externally over the temperature sensitive devices, as indicated by arrows 44. Under these conditions each pot 35 of the devices contains liquid sodium, the sodium in the pots 35 being substantially stationary as compared with that in the main coolant flowstream. Under normal conditions of reactor operation heat generated by fission of the fissile material in each sleeve 40 of the devices is transferred principally by conduction through the fusible link 41 and wall 33 to the surrounding liquid sodium which is flowing over the devices as indicated by the arrows 44. If for any reason the temperature of the surrounding sodium rises to the melting point of the material of the fusible link 41, the link melts (starting at the surface adjacent the sleeve 40) and runs down into the cavity 43. The sleeve 40 is then virtually thermally isolated apart from surface contact with the wall 32 of the pot 35, the temperature of the sleeve 40 rises and heat transfer from the sleeve 40 by way of the wall 32 of the pot 35 gives rise to detectable bubble formation in the liquid sodium in the pot 35, the sodium commencing to boil at the base of the pot 35. The bubble formation in the sodium in the pot 35 generates a spectrum of detectable sonic waves which may be monitored in a manner similar to that described above with reference to FIGURE 1.

Under normal reactor operating conditions the sleeve 40 to designed so that it generates 50 watts, approximately 35 watts of which is to be transferred to the liquid sodium in the pot 35 when the fusible link melts. This is sufficient to induce detectable "nucleate boiling" in the sodium in the pot 35, that is to say the formation of small bubbles which occurs as a preliminary to bulk boiling. The device thus functions as a capsule capable of giving a signal when the surrounding liquid sodium in which it is submerged reaches a predetermined temperature, and thus affords an immediate indication of any tendency to overheating.

The cavity 43 is of a size sufficient to retain fission products, and also the molten metal of the fusible link in a position clear of the sleeve 40, whilst accommodating any expansion of the sleeve 40. The argon in the gap 38 and cavity 43 ensures that the walls 32, 33 are not subjected to undue pressure-differential stresses.

The device of FIGURE 4 may be modified by fitting to the upper end of the sheath an annular end plate defining a central orifice which may be bridged by a wire. Vapour formed by boiling in the liquid sodium in the reservoir rises and passes through the orifice to meet the wire and form a pulsating vapour envelope. Alternate envelope and external coolant pulsation thus gives rise to oscillation producing sound waves detectable by remote receiving apparatus, the signal being stronger than that experienced with nucleate boiling. An alternative orifice configuration has two almost semicircular sectors.

To reduce the risk of blockage of the orifice, the device may be completely sealed, thus enclosing the orifice in a way similar to the enclosure of the orifice of FIGURE 2 as compared with the open device of FIGURE 1.

Transducers in accordance with the invention may also serve for power monitoring. Thus for a given material (fissile or absorber) associated with the compartment of the capsule, the heat generated is dependent on the power level at which the reactor is operated. Thus the heat transferred to the liquid in the compartment is proportional to the reactor power, so that a certain noise amplitude is associated with a particular power level, and variation of the amplitude can be used as a measure of power variation. In order to measure the neutron or gamma flux, a neutron or gamma absorbing material may be used for generation of heat within the capsule. The capsule construction for power or flux measurement is similar to that described above in respect of temperature indicating devices, the fusible link and its associated drainage cavity being omitted.

The invention is not limited to the details of the devices described above with reference to the drawings. Thus, for example, melting of the fusible link may alternatively be arranged to release pressurised gas stores in the capsule to cause detectable bubble formation in liquid in the reservoir thus giving a simulated boiling signal.

Whilst liquid sodium has been quoted by way of example as the reactor coolant, it is to be understood that other liquids may be used.

We claim:

1. In combination with a nuclear fuel element, a transducer for translating a physical effect into an acoustic signal, said transducer including a capsule having an outer wall, said capsule including a chamber therein in contact with the said fuel element and enclosing gases adjacent the fuel element, a compartment in said capsule and spaced from the capsule wall, a liquid in said compartment, a heat source means for heating the said liquid in the compartment, means for defining a heat conduction path of variable conductivity between said compartment and said capsule outer wall, and means responsive to variation of pressure within said chamber for altering the conductivity of said heat conduction path, the conductivity of said path being alterable by said means at least between a first condition wherein boiling of the liquid in the compartment is suppressed and a second condition wherein boiling of the liquid in the compartment takes place to generate the acoustic signal.

2. The invention according to claim 1 wherein the means responsive to variation of the pressure comprises a second liquid in the capsule, and means for defining a first and a second free surface in said second liquid, one free surface being in contact with the said chamber, and the portion of the second liquid beneath the second free surface constituting a part of said heat conduction path.

3. The invention according to claim 1 wherein the capsule defines a recess forming an extension of the said capsule wall, and the means responsive to variation of the pressure comprises means for causing said liquid to form a free surface in the liquid, said free surface being pressurized by gas in said chamber, said recess having one side immersed in said liquid below the free surface.

4. The invention according to claim 1 including a plate situated in said compartment and defining an orifice to influence the generated acoustic signal.

5. The invention according to claim 1 wherein said heat source is a fissile material.

6. In combination with a nuclear fuel element, a transducer for translating a physical effect into an acoustic signal, said transducer including a capsule having an outer wall, said capsule including a chamber therein in contact with said fuel element and enclosing gases adjacent the fuel element, a compartment in said capsule and spaced from the capsule wall, a liquid in said compartment, a heat source means for heating the said liquid in the compartment, and a plate situated in said compartment and defining an orifice to effect the generated acoustic signal, and including a pressure responsive member mounted in said capsule and closing off said chamber, and said member movable in response to pressure variations in said chamber to vary the size of the orifice.

7. In combination with a nuclear fuel element, a transducer for translating a physical effect into an acoustic signal, said nuclear fuel element including surfaces in heat conductive relationship with a stream of coolant flowing past the fuel element, an acoustic signal generator comprising a capsule having a wall, the outer surface of which is in heat conductive relationship with the same stream of fluid which flows past the fuel element, a compartment within said capsule and spaced from said capsule wall, a liquid in said compartment, a heat source means for heating the liquid in the compartment, means for defining a heat conduction path of variable conductivity between said compartment and said capsule wall, and a means responsive to variation of the physical effect for altering the conductivity of said heat conduction path, the conductivity of said path being alterable by said means at least between a first condition wherein the boiling of the liquid in the compartment is suppressed, and a second condition wherein boiling of the liquid in the compartment takes place to generate the acoustic signal.

8. The invention of claim 7 wherein said means responsive to variation of the physical effect includes a fusible link member interposed between said heat source and the capsule wall.

References Cited

UNITED STATES PATENTS 3,037,475   6/1962   Mickley _____ 116—26

FOREIGN PATENTS 915,861   1/1963   Great Britain.
967,473   8/1964   Great Britain.

REUBEN EPSTEIN, *Primary Examiner.*